United States Patent
Mariano et al.

(10) Patent No.: US 7,590,261 B1
(45) Date of Patent: Sep. 15, 2009

(54) METHOD AND SYSTEM FOR EVENT DETECTION BY ANALYSIS OF LINEAR FEATURE OCCLUSION

(75) Inventors: Vladimir Y. Mariano, Los Banos (PH); Rajeev Sharma, State College, PA (US)

(73) Assignee: VideoMining Corporation, State College, PA (US)

( * ) Notice: Subject to any disclaimer, the term of this patent is extended or adjusted under 35 U.S.C. 154(b) by 552 days.

(21) Appl. No.: 10/912,450

(22) Filed: Jul. 30, 2004

Related U.S. Application Data

(60) Provisional application No. 60/491,690, filed on Jul. 31, 2003.

(51) Int. Cl.
*G06K 9/00* (2006.01)
(52) U.S. Cl. .................................................. 382/103
(58) Field of Classification Search ................. 382/100, 382/103, 155, 181, 190, 134, 169; 356/364
See application file for complete search history.

(56) References Cited

U.S. PATENT DOCUMENTS

| | | | | |
|---|---|---|---|---|
| 4,392,119 | A | 7/1983 | Price et al. | 340/38 |
| 5,173,692 | A | 12/1992 | Shapiro et al. | 340/943 |
| 5,465,115 | A | 11/1995 | Conrad et al. | 348/155 |
| 5,684,898 | A | 11/1997 | Brady et al. | 382/282 |
| 5,748,775 | A | 5/1998 | Tsuchikawa et al. | 382/190 |
| 6,538,579 | B1 | 3/2003 | Yoshikawa et al. | 340/928 |
| 6,546,115 | B1* | 4/2003 | Ito et al. | 382/100 |
| 7,239,718 | B2* | 7/2007 | Park et al. | 382/103 |
| 2004/0136567 | A1* | 7/2004 | Billinghurst et al. | 382/103 |
| 2005/0163343 | A1* | 7/2005 | Kakinami et al. | 382/103 |

OTHER PUBLICATIONS

S. McKenna, S. Jabri, Z. Duric, and H. Wechsler, Tracking interacting people, Proceedings of 4th IEEE Int'l Conference on Automatic Face and Gesture Recognition, Mar. 2000, pp. 348-353.
K. Toyama, J. Krumm, B. Brumitt, and B. Meyers, Wallflower: Principles and Practice of Background Maintenance, Proceedings of 7th IEEE Int'l Conference on Computer Vision, Sep. 1999, pp. 255-261.

(Continued)

*Primary Examiner*—Brian P Werner
*Assistant Examiner*—Claire Wang

(57) ABSTRACT

The invention is a method for detecting events in an imaged scene by analyzing the occlusion of linear features in the background image. Linear features, curved or straight, in specific scene locations are either manually specified or automatically learned from an image or image sequence of the background scene. For each linear feature, an occlusion model determines whether the line or part of it is occluded. The locations of the lines of interest in the scene, together with their occlusion characterizations, collectively form a description of the scene for a particular image. An event, defined as a series of descriptions of the scene over an image sequence, can then be initially defined and subsequently detected automatically by the system. An example application of this is counting cars or people passing in front of a video camera.

10 Claims, 11 Drawing Sheets

OTHER PUBLICATIONS

C. Stauffer and W. Grimson, Learning Patterns of Activity Using Real-Time Tracking, IEEE Transactions on Pattern Analysis and Machine Intelligence, Aug. 2000, pp. 747-757, vol. 22.

I. Haritaoglu, D. Harwood, and L. Davis, W4: Real-Time Surveillance of People and Their Activities, IEEE Transactions on Pattern Analysis and Machine Intelligence, Aug. 2000, pp. 809-830, vol. 22.

J. Canny, A Computational Approach to Edge Detection, IEEE Transactions on Pattern Analysis and Machine Intelligence, Nov. 1986, pp. 679-714, vol. PAMI-8.

N. Guil, J. Villalba, and E. Zapata, A Fast Hough Transform for Segment Detection, IEEE Transactions on Imaging Processing, Nov. 1995, pp. 1541-1548, vol. 4.

* cited by examiner

METHOD AND SYSTEM FOR EVENT DETECTION BY ANALYSIS OF LINEAR FEATURE OCCLUSION

CROSS-REFERENCE TO RELATED APPLICATIONS

This application is based on and claims priority to U.S. Provisional Application No. 60/491,690, filed Jul. 31, 2003, which is fully incorporated herein by reference.

FEDERALLY SPONSORED RESEARCH

Not Applicable

SEQUENCE LISTING OR PROGRAM

Not Applicable

BACKGROUND OF THE INVENTION

1. Field of the Invention

The present invention is a method for detecting events in an imaged scene by spatial and temporal analysis of the occlusion of linear features in the scene.

2. Background of the Invention

Automatic detection of objects in a scene is an important problem with many applications. For example, in an outdoor or indoor environment, devices for detecting vehicles and people are used as tools for detecting events like a vehicle arriving or departing. These devices are strategically installed in locations in the scene where the objects of interest are expected to pass by. Special sensors are used by some methods.

U.S. Pat. No. 6,538,579 by K. Yoshikawa and S. Sunahara disclosed a method and apparatus for detecting moving vehicles. An array of distance sensors, arranged to face a single direction, are installed above a detection line. Each sensor detects the vehicle at a single location and the array of sensors are linked to a detection processor which detects events like vehicle entry and vehicle exit.

U.S. Pat. No. 4,392,119 by R. Price, et al., disclosed an apparatus for detecting the arrival of a vehicle in a drive-in window. A loop detector, installed on the vertical wall below the drive-in window, senses the metallic sides of a present vehicle. The detector sends an electrical signal whenever a vehicle is present in front of the window, enabling the apparatus to detect events like a vehicle arriving or a vehicle waiting for a certain length of time.

U.S. Pat. No. 5,173,692 by B. Shapiro and Y. Rosenstock, disclosed the use of two overhead ultrasonic detectors attached to a computer to count and classify vehicles. The two detectors, installed along a vehicle's path of travel, can be used to operate devices like traffic lights and gates.

The popularity of image-capturing devices attached to computers has made it possible to use image analysis to detect objects in a scene. One approach is to model the transitions between the background scene and foreground objects. U.S. Pat. No. 5,465,115 by G. Conrad, B. Denenberg and G. Kramerich, disclosed a method for counting people walking through a restricted passageway, such as a door. Using the image taken from an overhead video camera, a narrow image window perpendicular to the traffic flow is analyzed. This narrow image is divided into short image segments, called "gates", which are points of detection. The thresholded differences of these gate images across consecutive frames are used to detect persons crossing the gate. Since the gates' widths are small, one passing person would occlude several contiguous gates. The method depends heavily on the speed of the moving objects; they have to be fast enough to record significant frame-to-frame differences. The event of one person passing can even register several significant differences. Certainly, the method would not work if a person stops in the location of the window.

The more popular approach using image analysis is to create a model of the image of the background scene and classify regions in a scene's image as either background or foreground, which is the object region. Many computer vision systems use a background image model to detect and track objects in an imaged scene. The idea is a system that maintains a model of the background, which is the scene without any objects in it. This model can be an image of the background or some statistics of its sub-images. Whenever a small region of an input image is significantly different from the corresponding region in the background model, the location of that region is tagged as foreground, which means part of an object region. Spatial and temporal post-processing techniques refine the localization of the object region.

In the work of S. McKenna, S. Jabri, Z. Duric, and H. Wechsler, "Tracking interacting people", Proceedings of $4^{th}$ IEEE Int'l Conference on Automatic Face and Gesture Recognition, pp. 348-353, March 2000, each color pixel in the background image is modeled as separate Red, Green, and Blue Gaussians. Each has a mean and variance which are continuously adapted to account for slow changes in outdoor illumination. The corresponding pixel in an input image is considered foreground is its value is a few standard deviations away from the mean. Gaussian models for chromaticity and gradient are added to classify object shadows as part of the background.

Instead of maintaining the distribution parameters for each pixel, K. Toyama, J. Krumm, B. Brumitt, and B. Meyers, "Wallflower: Principles and Practice of Background Maintenance", Proceedings of $7^{th}$ IEEE Int'l Conference on Computer Vision, pp. 255-261, September 1999, maintains the past values of the pixel and uses a linear function to predict the value of the background pixel in the next frame. If the pixel in the next frame deviates significantly from its predicted value then it is considered foreground.

The gradual and sometimes sudden changes in scene illumination, plus the problem of slow-moving objects requires a more complex model for each background pixel value. C. Stauffer and W. Grimson, "Learning Patterns of Activity Using Real-Time Tracking", IEEE Transactions on Pattern Analysis and Machine Intelligence, pp. 747-757, Vol. 22, August 2000, proposed multiple, adaptive Gaussians to model to each pixel. Multiple Gaussians are maintained for the background, and pixels that do not match any one of these Gaussians are considered foreground.

In the work of I. Haritaoglu, D. Harwood and L. Davis, "W4: Real-Time Surveillance of People and Their Activities", IEEE Transactions on Pattern Analysis and Machine Intelligence, pp. 809-830, Vol. 22, August 2000, each background pixel is represented by three values: its minimum, its maximum and maximum frame-to-frame intensity difference during a training period. This initial training period of about 20 to 40 seconds is when the background model is initially learned, which takes place even when objects are moving around the scene. This method is designed for scenes where an object cannot stay in one place very long. Otherwise, it will be included as part of the background. One such situation is when a car stops in the middle of the scene and stays there for minutes.

U.S. Pat. No. 5,748,775 by M. Tsuchikawa, A. Sato, A. Tomono and K. Ishii, disclosed a method for continuous reconstruction of the background image for background subtraction. A temporal histogram is maintained for each pixel and a statistical method is applied to determine whether the temporal changes are due to abrupt or gradual illumination changes. Background pixels are updated using statistics of the past values, computed from the temporal histogram.

Instead of working with the whole image of the background, U.S. Pat. No. 6,546,115 by W. Ito, H. Yamada and H. Ueda, disclosed a method wherein the image view is divided into several sub-views, each of which has a maintained background image of the sub-view. The system is used for detecting objects entering the scene. Each sub-view is processed independently, with the system detecting movement in the sub-view by computing the intensity differences between the input sub-image and the corresponding background sub-image. If an object is detected in a sub-view then the corresponding background sub-image is not update, otherwise it is updated.

Dividing the background image into several sub-images is also employed by U.S. Pat. No. 5,684,898 by M. Brady and D. Cerny, which disclosed a method for distinguishing foreground from background pixels in an input image for background subtraction. A weighting function takes the difference between pixel intensities of the background sub-image and that of the corresponding pixels in the input sub-image, and the weights are used to classify pixels in the input sub-image. If a background sub-image is not significantly different from the current input sub-images, it is updated. The method would work well if the objects are constantly moving in the scene.

The main idea behind the image-based methods of background subtraction is that a point location in the scene is occluded by a foreground object if its pixel value in the input frame is significantly different from the expected value in the background model. The model is initially learned from an image sequence and continuously updated in order to adapt to changes in scene illumination.

These methods suffer from problems resulting in the corruption of the background model. A requirement of these methods is that objects should be constantly moving so as not to occlude parts of the background for long period of time. When an object stays too long in one location then the history of past values or their distribution becomes significantly different from that of the true background. Furthermore, when an object is in one location and the ambient illumination changes drastically then the background model in that location could be permanently corrupted even if the object moves later and exposes the background.

The root of these problems lies in the difficulty of modeling the value of a background pixel over time. The value of a pixel is not stable over a wide range of imaging conditions, especially outdoors where intensity values can gradually or drastically change and have a wide range across different times of the day and varying weather conditions. Image-capturing devices, particularly those that employ auto-exposure, also contribute to the variability of the pixel value.

The image gradients, or image edges, however are much more stable under varying imaging conditions. The presence of an edge in the scene causes significant differences between the values of adjacent pixels in the image location of the edge. In a particular point in the image, the pixel values could vary, but the presence of edges can be easily determined. If a point in the scene is occluded, the pixel value may or may not have changed. When changes are observed, it could be due to an occluding object or other factors like weather, auto-exposure, and time of the day. On the other hand, an edge point in the scene would almost certainly disappear if occluded by an object.

The idea of detecting the occlusion of edge points is extended to linear features. A linear feature is a group of edge points in a continuous and contiguous arrangement. Lines are found in many indoor and outdoor scenes. Roads, sidewalks, buildings, grocery aisles, doors, windows, fences, and outdoor fixtures have lines in them. One can observe that most of these lines are fixed and are visible across varying lighting and weather conditions. Many of these fixed lines can be seen as occluded by people or vehicles when viewed from certain angles. By placing image-capturing devices in places such that it can capture objects occluding linear features, the fixed linear features can serve as detection points—locations where objects can be detected. Multiple linear features in the scene allows "occlusion events" to be defined. For example, if two parts of a line of a road curb are occluded one after another, then this could be an event of a car passing by. Another example is an indoor event of one person going through the door if the lines on the doorframe and certain lines on the floor are occluded in succession.

For some applications it is sufficient to have a few detection points in the scene in order to describe events and have a system to automatically detect them. With a few detection points, it is not necessary to process the entire image unlike many of the previous image-based methods. To determine line occlusions, the system needs to process only the pixels along the location of the linear features, making it computationally inexpensive.

The biggest advantage of a system for detecting line occlusions in a scene is that detection can be done per image, independent of the information found in previous images of the scene. Given a fixed image-capturing device and the image location of the scene's fixed linear features, no prior information is necessary to compute occlusions. This is in contrast to the image-base techniques described in the prior art where information from previous images is used to build and update the background image model.

The present invention is described in the following section and illustrated by two exemplary embodiments together with their accompanying drawings.

SUMMARY OF INVENTION

A computer vision system with a static image-capturing device is used to continuously capture images of a scene. The system is initialized by manually marking the locations of linear features of interest in the background image containing no objects. Alternatively, the linear features can also be automatically learned from an image sequence of the background. These linear features are the detection locations, and can either be straight or curved.

An object is detected in a linear feature's image location if that linear feature, or part of it, is occluded. The computer vision system captures images of the scene continuously. For each captured image, the marked linear features are examined for occlusion. An exemplary model describes a linear feature, which is said to be composed of a series of contiguous edge points. The exemplary model can be used to determine whether a linear feature, or part of it, is occluded by an object.

For any given image frame, the system creates a description of the scene. This description is the collection of all the linear features of interest together with their occlusion characteristics. An event is the temporal behavior of a scene and is defined as the changes in the description of the scene over a period of time.

A list of predefined events is defined in the system. Each event is either manually defined when the system is initialized or automatically learned from an image sequence exemplifying the event. When the system is running, it is given a sequence of images, and the system continuously checks if any of the events in the list has occurred. For any event that occurred, the system can respond appropriately.

Two exemplary embodiments are described. First is an outdoor system for detecting events generated by vehicles in a street scene. The edge of the roadside curb gets occluded when a vehicle passes by. In the captured image, two lines are manually defined corresponding to two parts of the curb's edge. When part of an image line is not detected by the system, then the line is said to be entirely or partially occluded by a vehicle. Initially, a list of events is manually defined in the system, each event defined as a sequence of whole or partial occlusions of the defined lines. By checking these events on a sequence of captured images, the running system automatically detects scene events like car detection, a car driving by, or a stopped car.

The second embodiment described is an indoor system for monitoring customer behavior within an aisle of merchandise within a store. The edges of the shelves get occluded when a person is in the aisle. These edges are marked as lines in the captured image. Occlusion of groups of lines over time are used to define events like a person passing from right to left, or a person stopping at two locations in the aisle.

DETAILED DESCRIPTION OF THE INVENTION

Two embodiments are described which exemplify the method and apparatus for event detection using linear features. These two embodiments demonstrate useful applications on the invention. The invention roughly consists of image capture, linear feature definition, event definition and event detection. The term "linear feature" would refer not only to straight lines but also to curvilinear features.

Figure 1:
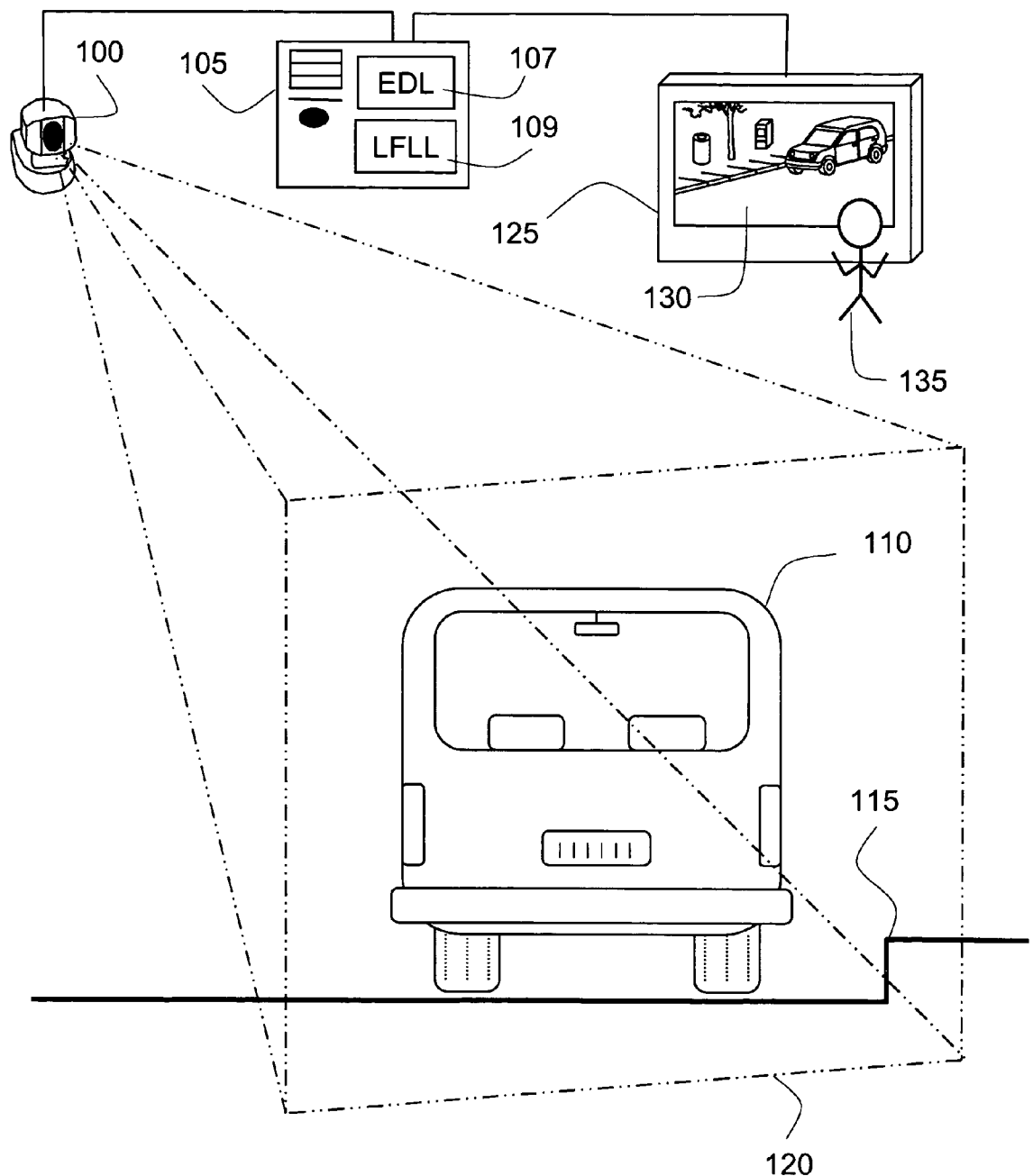
FIG. 1 is an overall view of the first exemplary embodiment of the invention where the system is setup to detect vehicle events in an outdoor setting.

FIG. 1 shows the setup of the first exemplary embodiment of the invention. A static image-capturing device 100 captures images of a view 120 of a scene. The images are processed by an attached computer 105. In the computer's memory are two lists—the Linear Features Location List (LFLL) 109 and the Event Definition List (EDL) 107. An image display device called a "monitor-input" 125, attached to the computer, displays images 130 of the events happening in the scene. The monitor-input 125 has input capabilities where a user 135 can select or mark points on the displayed image 130. User input will be used for the manual specification of the linear feature locations or the manual specification of the events.

The image-capturing device 100 is mounted such that the objects of interest 110 are observed. A requirement for mounting is that the viewing angle should allow the objects of interest to occlude a linear feature 115 in the scene. The background in this exemplary embodiment is a street scene with vehicles 110 moving in one direction. The image-capturing device 100 is mounted such that the edge of the curb 115 is occluded whenever a vehicle passes.

This exemplary embodiment can be used for many different applications. In a surveillance application, a security system could be used to detect vehicles or people entering private property. The image-capturing device can angled in such a way that lines in the scene serve as detection points. Traffic monitoring applications can use the system to measure traffic parameters. One such parameter is the count of vehicles entering tollbooths, bridges or highways. Structural edges and markings on the road are occluded by passing vehicles. In property management applications, the system could monitor the number and frequency of cars coming into a parking lot. Commercial establishments like convenience stores, gas stations or stores with drive-through windows can use the system to monitor customer flow during different times of the day, times of the year, or different weather conditions. The structures in these establishments have plenty of linear features that can be used for detection.

Figure 2:
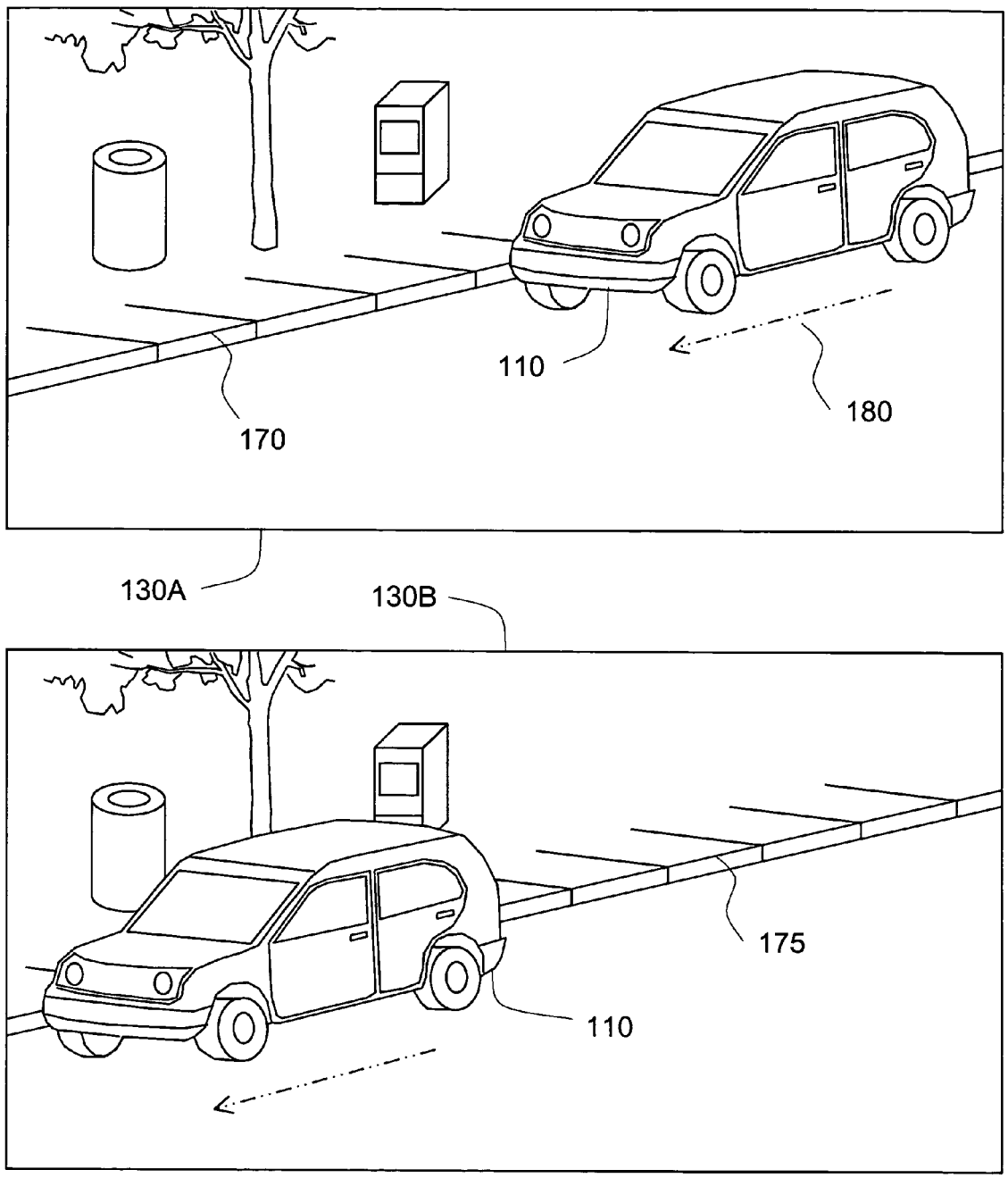
FIG. 2 shows two captured images in the first exemplary embodiment, showing object movement and occlusion of scene features.

The captured images 130 are displayed on the monitor-input 125. FIG. 2 shows two example images captured by the system and how objects occlude linear features. The street scene shows the edge of the curb (170, 175) occluded as a vehicle 110 passes on the road. For this embodiment, the vehicle 110 moves only one direction 180. The first image 130A shows a vehicle 110 that has just entered the scene and occluded one part of the curb. Another part of the curb 170 is visible. In the second image 130B, the vehicle 110 has moved forward and the previously occluded part of the curb is now visible 175. The visible part of the curb 170 in the first image is now occluded.

Figure 3:
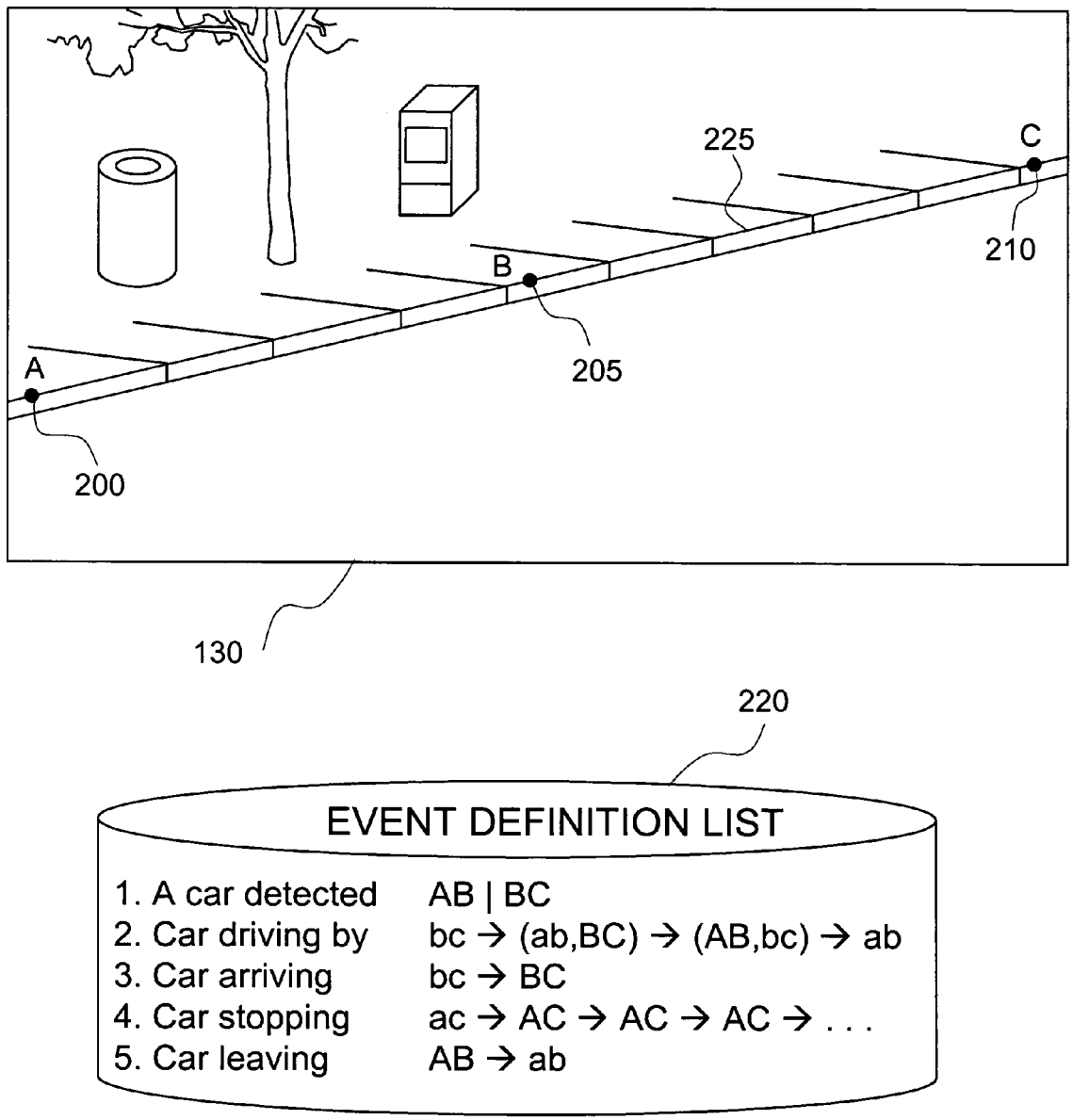
FIG. 3 shows the defined linear features in the first exemplary embodiment and the list of events defined from the occlusion of these linear features.

FIG. 3 shows an image 130 of the same scene but without the objects of interest. The edge of the roadside curb 225 is seen as a linear feature in the image 130. The occlusion of this linear feature is what will be used to define events 220 which will then be automatically detected by the running system. Two lines will be used to define the events. First is the line from Point A 200 to Point B 205 and the second line is from Point B 205 to Point C 210.

Figure 6:
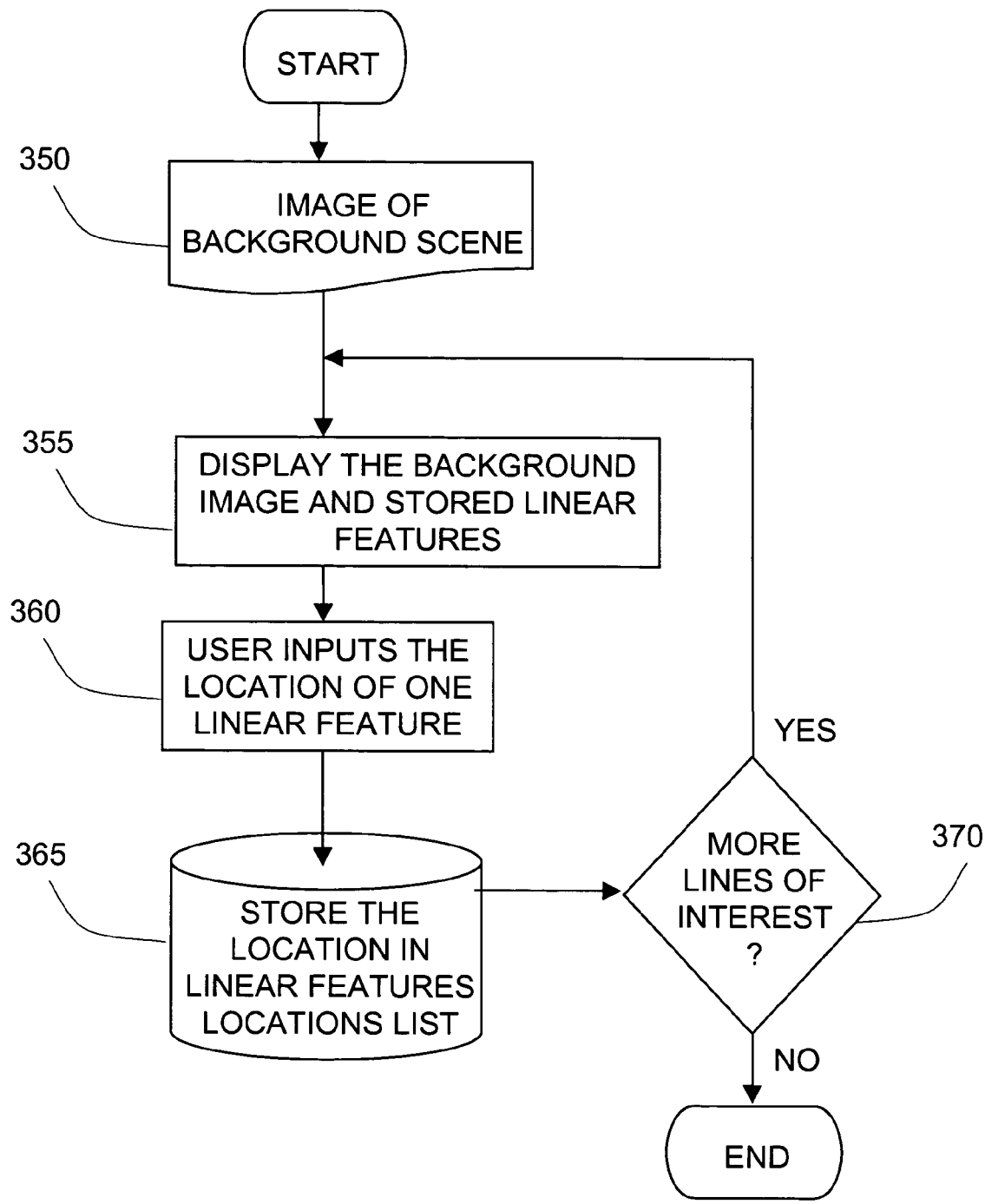
FIG. 6 shows the process of manually defining the linear features in the image of the background scene.

As part of initializing the system in FIG. 1, the user 135 inputs the location of the linear features on the monitor-input while viewing the image of the scene 130. Here the term "location" refers not only to the coordinates of the endpoints but also to the curvature information if the features are curvilinear. The locations are then stored in the attached computer 105. FIG. 6 shows the flowchart of the process of entering the location of the linear features. An image of the empty background scene 350 is retrieved from the attached computer (105 in FIG. 1). The said background image is displayed 355 on the monitor-input (125 in FIG. 1). Any stored linear feature is overlaid on the background image. The user then pinpoints the location of one linear feature 360 using a pointing device such as a mouse or by touching the screen if the monitor-input is touch-sensitive. The location is then stored 365 in Linear Features Location List (LFLL) which is in the computer's memory. The input is repeated 370 while there are more linear features to be defined.

Figure 7:
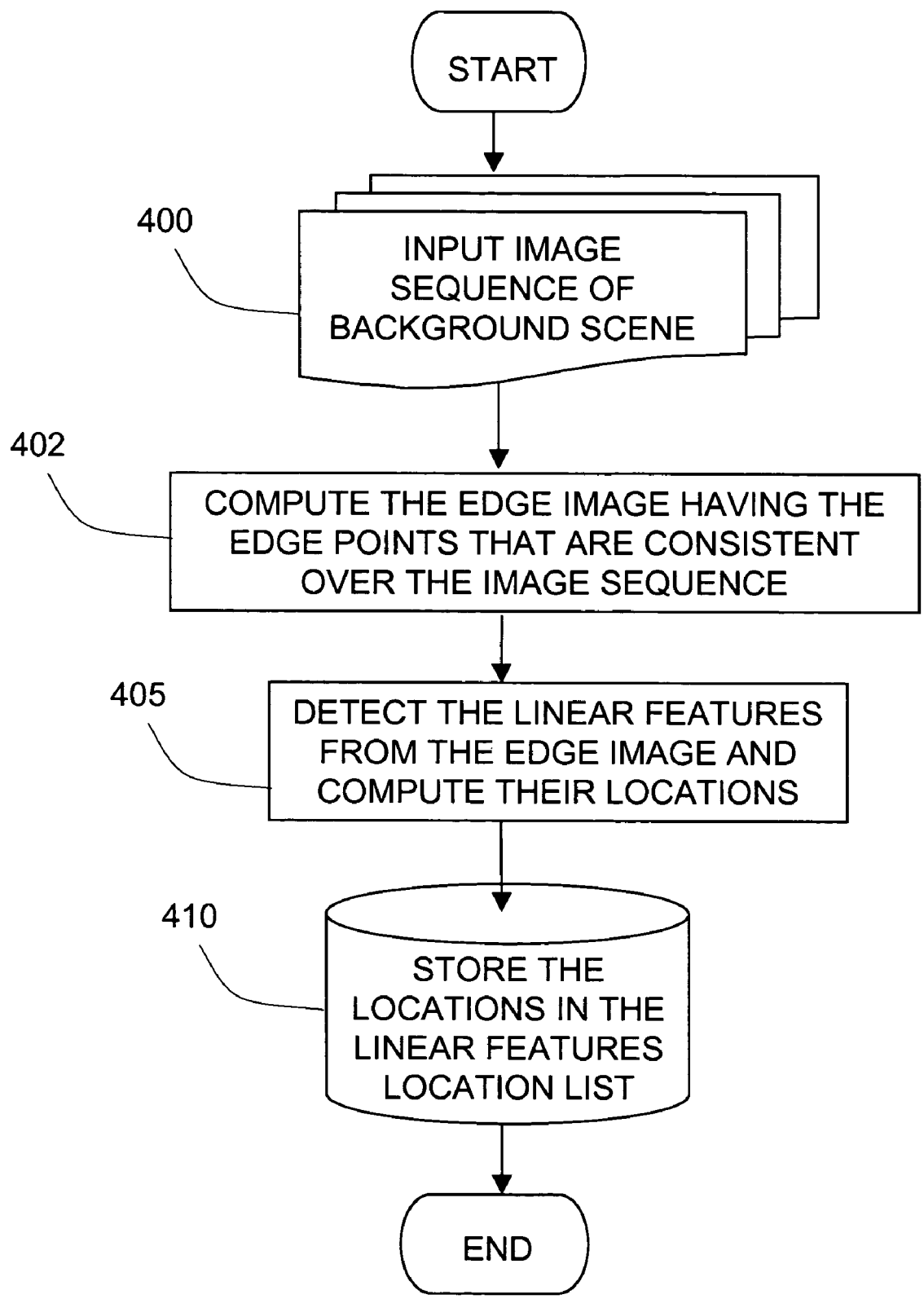
FIG. 7 shows the process of automatic definition of the linear features using an image sequence of the background scene.

One alternative to manually specifying the location of the linear features is to allow the system itself to detect the lines and find their locations. This process can be done by analyzing an image sequence of the background scene, finding the edges that are consistent over the entire image sequence, and applying a line-detection algorithm. FIG. 7 describes the general process for automatic linear feature specification. An image sequence of the background scene is captured as input 400 to the system. The captured image sequence can have objects moving in it as long as each linear feature in the background is visible most of the time during the capture period. An edge detector, such as J. Canny, "A Computational Approach to Edge Detection," IEEE Transactions on Pattern Analysis and Machine Intelligence, vol. PAMI-8, pp 679-714, November 1986, can be used to detect the edge points in each image. Pixel locations containing edge points that are consistent, which means present in the same location for most of the images in the sequence, are retained as edge points in the edge image 402. The computed edge image is run through a line detector, such as N. Guil, J. Villalba, and E. Zapata, "A Fast Hough Transform for Segment Detection," IEEE Transactions on Image Processing, vol. 4, pp 1541-1548, November 1995, to detect the linear features and compute their location. The locations are finally stored 410 in the LFLL in the computer. This automatic alternative can be useful when the scene has many linear features to be defined or to make system initialization and setup faster.

An event can be described as objects exhibiting certain behavior in a scene. An object could just be fixed in one place, entering from one side, stopping in one location or hopping between two locations. Different kinds of events can be defined, the variety of which depends on the application. The present invention uses linear features as detection points for defining scene events. As elaborated in the prior art section, the linear feature is a very robust feature. The present invention takes advantage of robust detection of linear features across different lighting conditions, especially outdoors across different times of the day and different weather conditions.

FIG. 3 shows the events 220 for the first exemplary embodiment. These events are stored in the Event Definition List (EDL). These five simple events are of interest to the user, who has manually defined them. An event definition is composed of one or a series of scene descriptions. A scene description states which lines are occluded or unocclude at one particular time. The first event, "A car detected", has only one scene description, "AB|BC", which means either the line from Point A 200 to Point B 205 is occluded or the line from Point B 205 to Point C 210 is occluded. A pair of capital letters such as "AB" or "BC" means that the line defined by the two points is occluded while a pair of lowercase letters such as "ab" or "bc" means that the line between those two points is not occluded. In the second event, "Car driving by", the event starts with the unoccluded line "bc" as the initial scene description. As the vehicle enters the scene from the right side, line "BC" becomes occluded while no object is on line "ab", thus the scene description "(ab,BC)". The vehicle moves forward to the left side of the background, yielding a scene description "(AB,bc)" which has the line "AB" occluded while line "bc" is unoccluded. Finally, the car's drive-by is completed by the scene description "ab" in which the vehicle has left and uncovered the line "ab". The other events in the list are interpreted in same way. Thus an event is consists of a series of scene descriptions, with each one showing the occlusion state of the linear features in the image.

Figure 8:
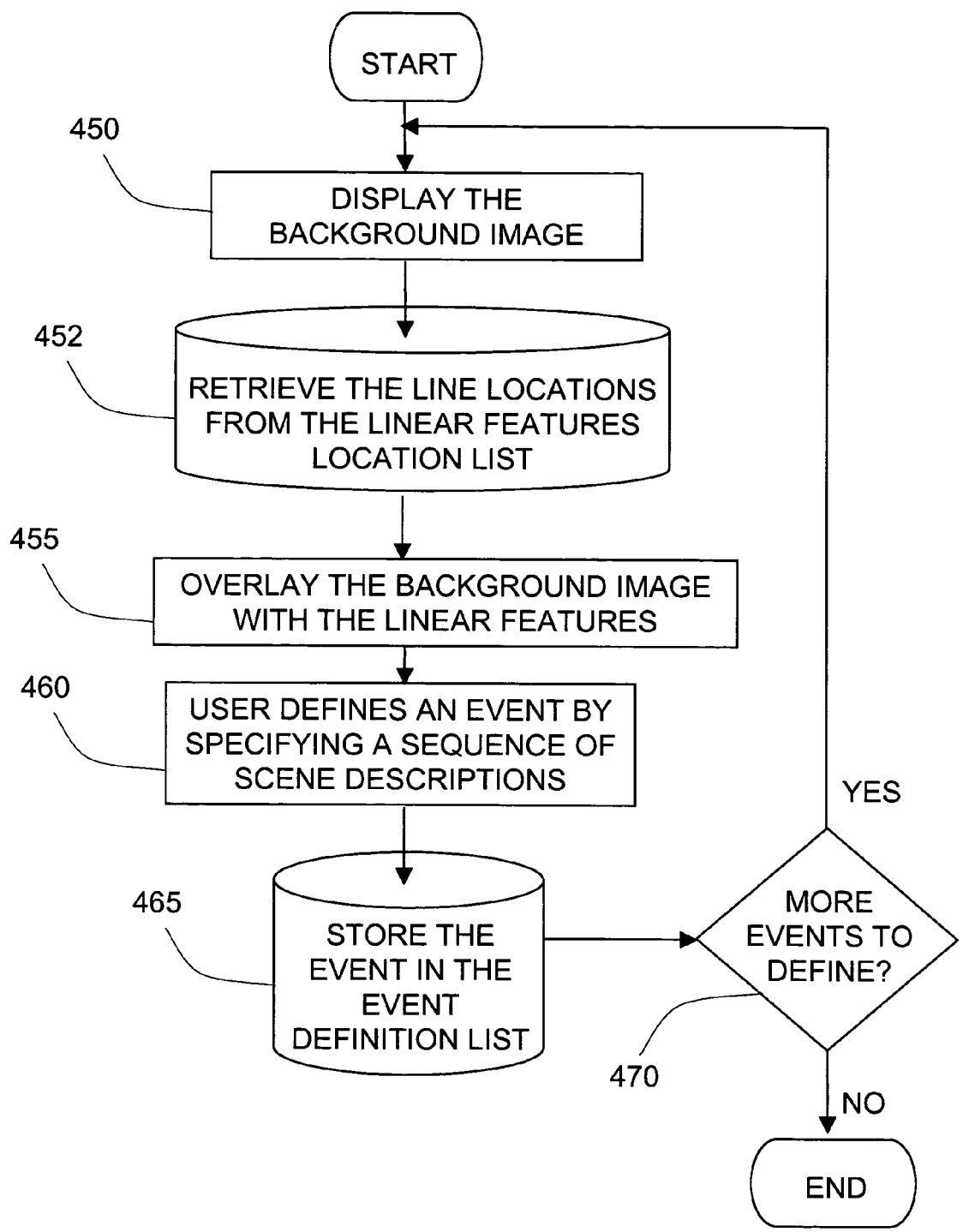
FIG. 8 shows the process of manually defining the events given the locations of the linear features.

FIG. 8 shows the process of manually defining an event. It is assumed that the linear features to be used are already specified and stored in the LFLL. For each event to be defined, the background image is first displayed 450 on the monitor-input. The linear features in the LFLL a retrieved 452 and overlaid 455 on the displayed background image. The user then defines one event 460 by specifying a sequence of scene descriptions. Each scene description is defined by the user by selecting the linear features which are occluded for that description and which are not. Upon completion by the user, the sequence of scene descriptions is given a name and stored as an event 465 in the Event Definition List (EDL). The user can define more events 470 as needed.

Figure 9:
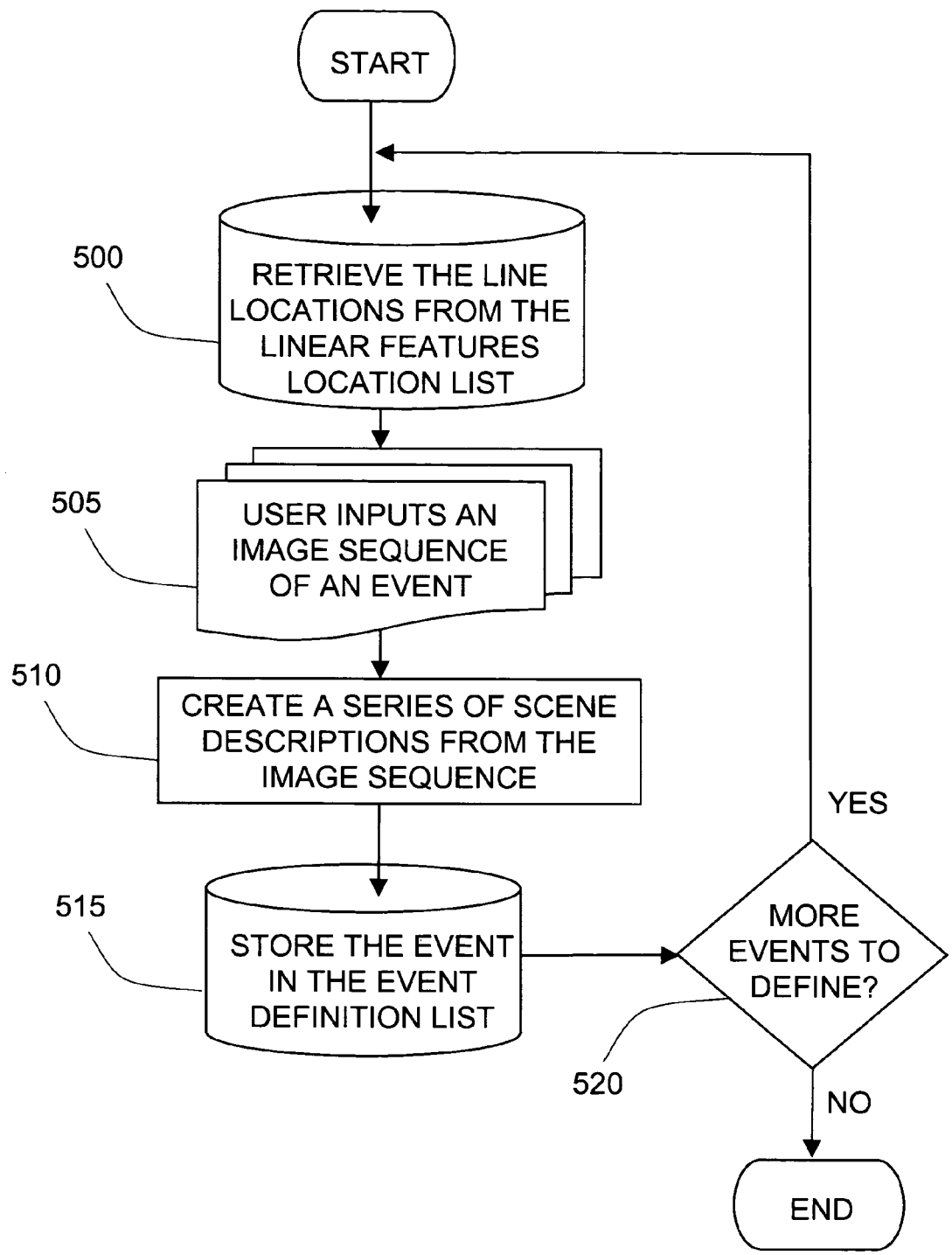
FIG. 9 shows the process of automatic learning of events using exemplary image sequences of the events.

An alternative to manually defining an event is to let the system learn from an exemplary image sequence of the event. For example, the user can present an image sequence of a vehicle stopping in the middle of the scene and then driving off. The system would use this image sequence together with the defined linear features to create the event "Car stopping and leaving". FIG. 9 shows the process of event learning. The system first retrieves the linear features' locations from the LFLL 500. The user is then asked to input an image sequence 505 of the event to be defined. By analyzing the occlusion of the linear features, the system creates scene descriptions from the image sequence 510. The series of scene descriptions are stored in the EDL 515 and given a name by the user. More events can be defined 520 by the user. This alternative is useful to speed up event definition or if there are many events to define.

Figure 10:
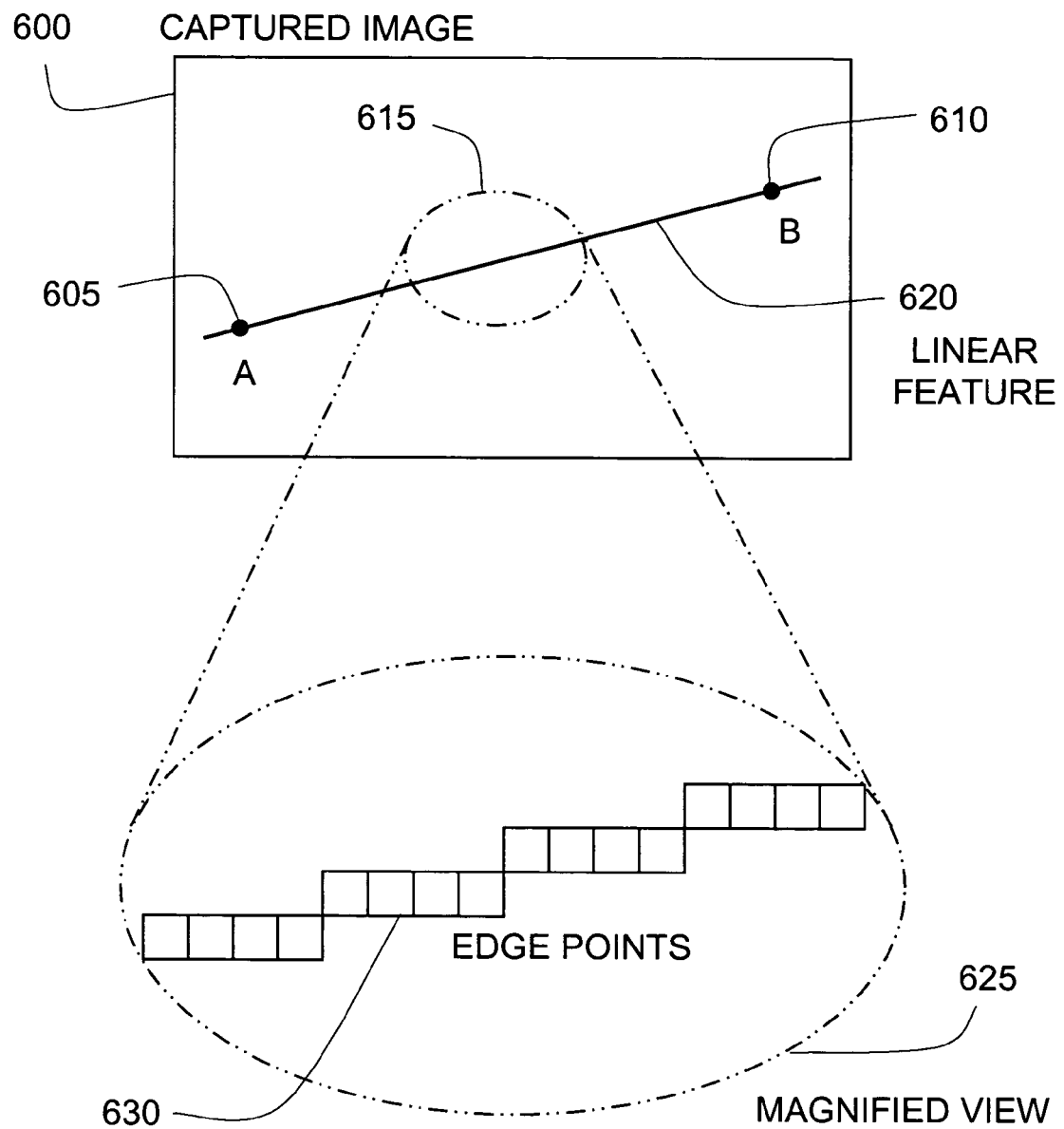
FIG. 10 is an exemplary model of a linear feature, which can be used to form rules for determining linear feature occlusion.

The present invention relies on its robust detection of the defined linear features. Different methods can be used for detection, each one dictated by a model. FIG. 10 shows one exemplary model of a linear feature. The captured image of a background scene 600 contains a linear feature 620. The location of this line has been defined as endpoints A 605 and B 610. The exemplary model describes the linear feature as a series of contiguous edge points. Looking at a small portion 615 of the line, the magnified view 625 shows the series of edge points 630. Each edge point has its image coordinates. To detect if the linear feature is occluded in an input image, the system takes the linear feature and checks each edge point's coordinates within the input image. If an edge is found in the input image at the said coordinates, then an evidence of the line is found. If a significant number of edge points are not found, then the system can conclude that an occlusion has occurred. Rules can be applied, such as edge points should be contiguous or that tiny, isolated edge point segments should be discarded as noise. Rules can also be formed for detecting partial occlusion of the linear feature. In addition to this exemplary line model, other models can be employed for the purpose of line occlusion detection.

Figure 11:
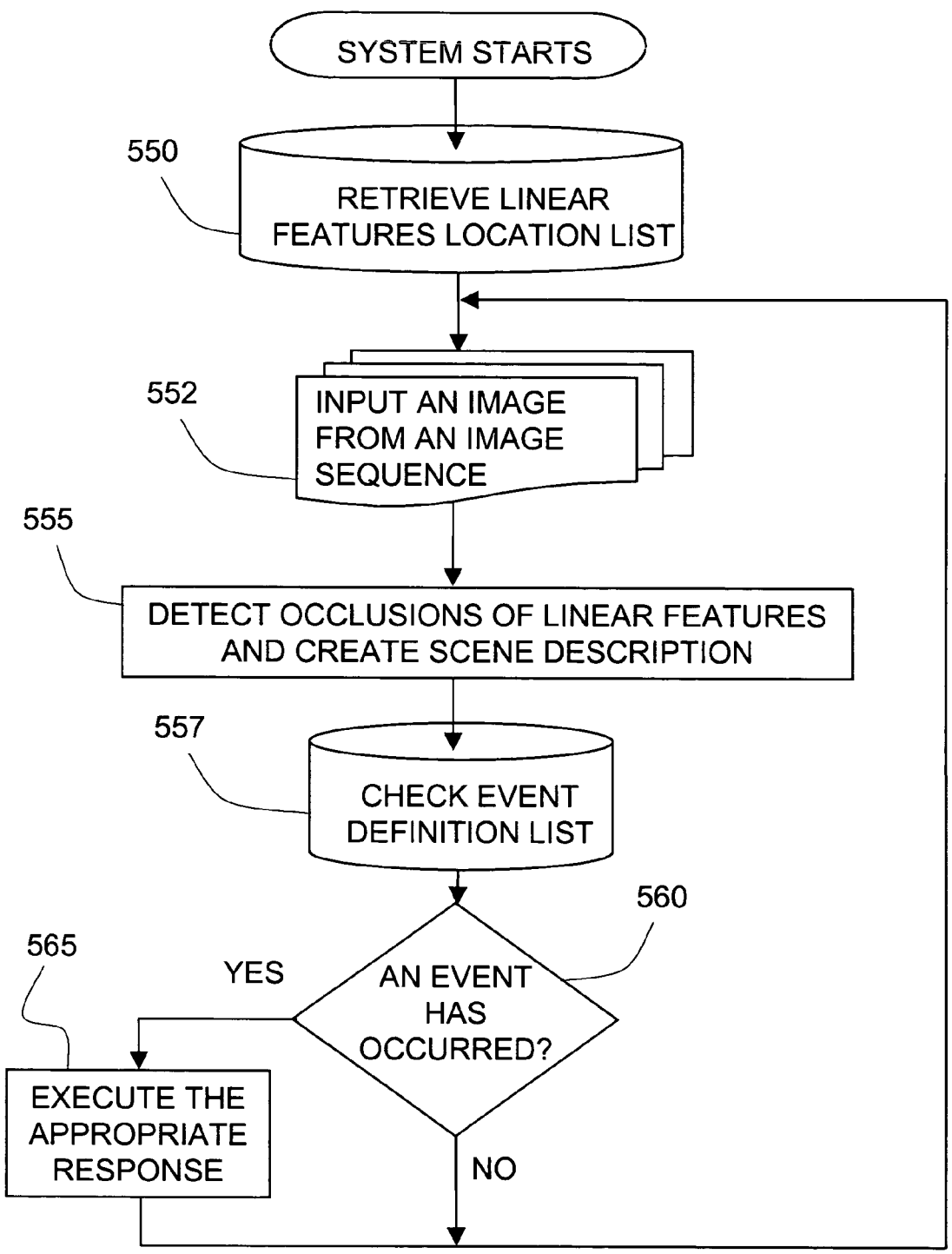
FIG. 11 shows the process of the system analyzing a sequence of images and detecting events given the linear features and the event definitions.

Once the system is initialized with all the linear features and events defined, the system can start processing image sequences to detect events. FIG. 11 shows the general process of a running system. The linear features information is first retrieved 550 from LFLL. The images from the image-capturing device are continuously fed as input 552. For each input image, the system detects each linear feature of the LFLL and determines whether it is occluded or not 555. A scene description is created from the determined occlusions 555. Given the scene description of the current input image and the history of scene descriptions from previous images, the system checks the EDL for events 557 that might have occurred. If an event has occurred 560, the system executes a response appropriate for the event that just occurred 565. The process repeats, accepting input images and detecting event occurrences.

Figure 4:
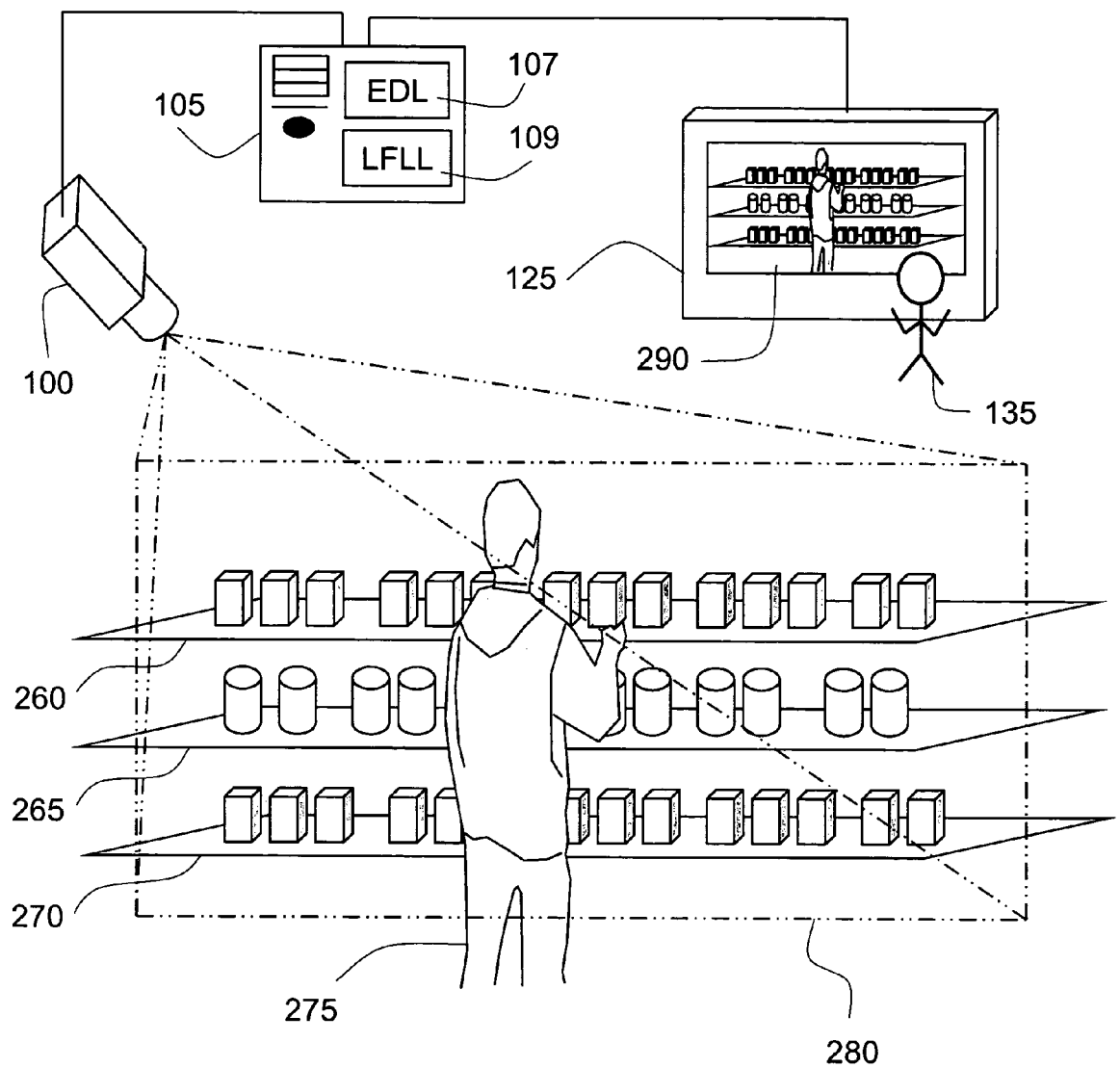
FIG. 4 is an overall view of the second exemplary embodiment of the invention where the system is setup to detect person events in an indoor setting.

The second exemplary embodiment is shown in FIG. 4. Like the first exemplary embodiment (FIG. 1), a static image-capturing device 100 is attached to a computer 105 and a monitor-input device 125 is attached to the computer. The computer stores the Linear Features Location List (LFLL) 109 and the Event Definition List (EDL) 107. The captured images 290 are displayed in the monitor-input 125. The user 135 sees the displayed images 290 and uses the monitor-input device to mark the locations of static linear features and select them later for event definition.

The scene in the exemplary embodiment is an aisle of a retail establishment. The system is set up to monitor the behavior of customers 275 within the aisle. The goal is to detect events like a person passing from left to right, a person stopping in two aisle locations, or any other customer behavior. Such a system would be useful for market research. For example, a marketing consultant can find out if more customers are more interested in Brand X than the competition Brand Y. The system could count, over a 30-day period, how many customers stopped near the Brand X products and how many customers stopped near the Brand Y products. The consultant can also find out if customers pause because ad in the aisle caught their attention.

Figure 5:
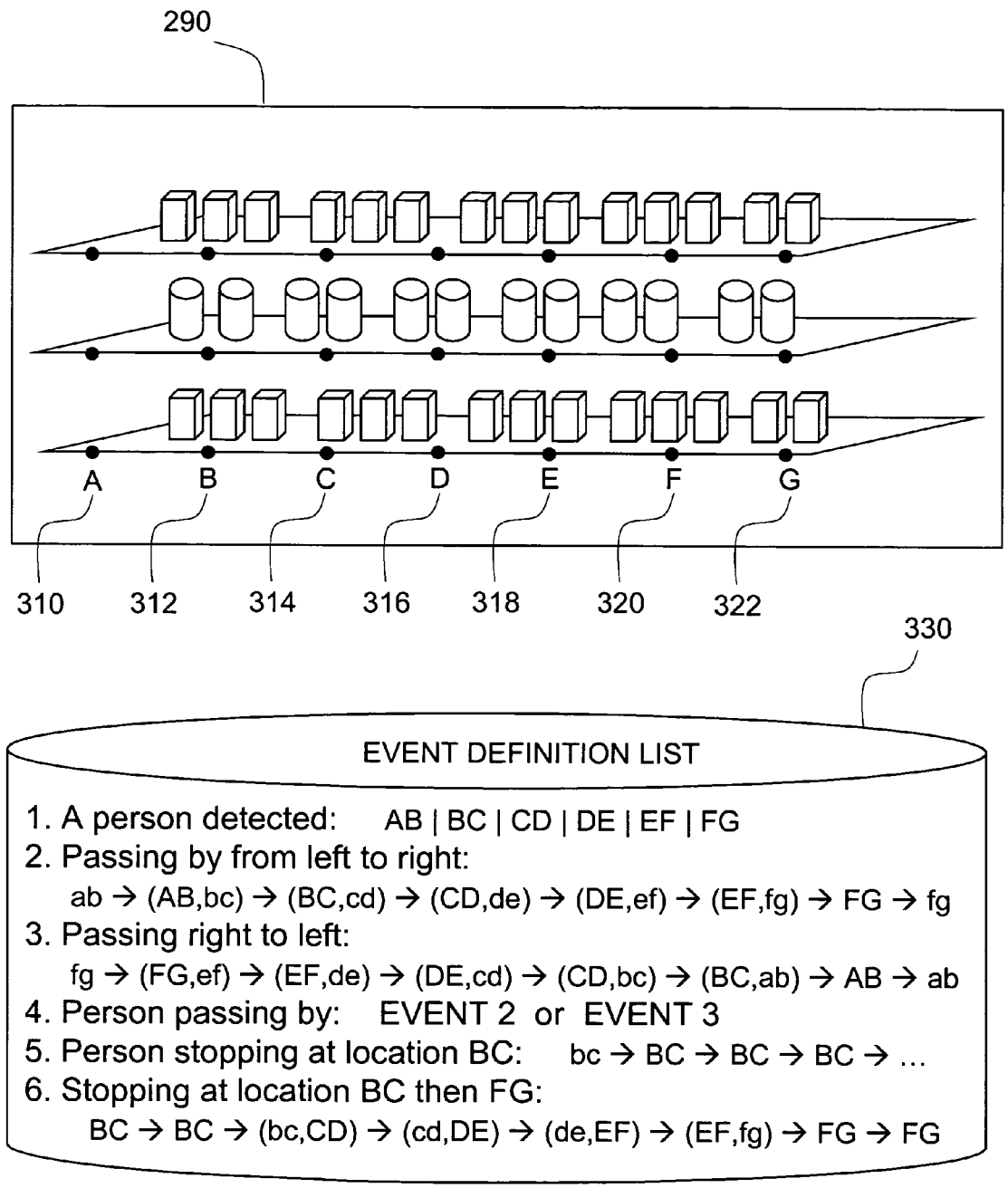
FIG. 5 shows the defined linear features in the second exemplary embodiment and the list of events defined from the occlusion of these linear features.

In the aisle scene of the exemplary embodiment, the edges of the shelves 260, 265, and 270 are occluded by the customer 275 from the view of the image-capturing device 100. FIG. 5 shows the captured image 290 of the scene. The edges of the three shelves serve as the linear features in the image 290. Seven groups of points are defined along the three shelf lines. Group A 310 consists of three points in one column, where each point is in a different shelf. Group B 312 also has three points on three shelves. Groups C through G (314, 316, 318, 320, and 322) also have their corresponding point groups. A column-group is defined as a vertical group of line segments between two groups of points. For example, column-group "DE" consists of the three line segments between the points of Group D and points of Group E. When a customer is in location BC in the aisle, then one or more line segments in column-group "BC" gets occluded.

The Event Definition List (EDL) 330 for this exemplary embodiment list possible events and their definitions. Instead of single lines, occlusions are detected for column-groups. A column-group is said to be occluded if one or more line segments in the group are occluded. An event is a sequence of scene descriptions, which is defined by the column-groups that are occluded (and those that are not occluded).

As in the first exemplary embodiment, the linear features in the scene of the second exemplary embodiment can be manually defined using the process in FIG. 6 and stored in the LFLL. The alternative way would be an automatic detection of the linear features like the process in FIG. 7. The process in FIG. 8 can be used to manually define the events and store in the EDL. The alternative would be the system's automatic event learning of the given an exemplary image sequence of the event. This process is shown in FIG. 9. Given the LFLL and the EDL, the process in FIG. 11 shows the system processing a constant input of images, detecting the linear features in the LFLL to create scene descriptions, and checking the EDL if any of the defined events have occurred.

The two exemplary embodiments, described in detail with the drawings and description, illustrate the use the present invention for many applications. The illustration is exemplary and not intended to be restrictive in character. The changes and modifications that come within the spirit of the invention are desired to be protected.

What is claimed is:

1. A method for detecting scene events, comprising the steps of:
   (a) capturing a sequence of background images using a camera;
   (b) specifying a location of one or a plurality of background linear features, each background linear feature having edge points which are present for most of the images of the background image sequence;
   (c) computing a state of occlusion of the background linear feature using a computer by;
       (i) inputting an image from a second image sequence;
       (ii) applying an edge detection method to the input image at the same location as the background linear feature to detect an input image linear feature; and
       (iii) comparing the input image linear feature with the background linear feature;
   such that the state of occlusion of the background linear feature is occluded if a portion of the background linear feature is not present in the input image from the second image sequence, and
   the state of occlusion of the background linear feature is not occluded if the background linear feature is present in the input image from the second image sequence;
   (d) creating a definition of a scene description as a plurality of background linear features in an image of said scene together with their state of occlusion;
   (e) creating a definition of an event as a sequence of scene descriptions; and
   (f) processing said image sequence to detect the occurrence of one or a plurality of said event.

2. The method according to claim 1, wherein the method further comprises a step of specifying the location of at least a linear feature that comprises straight lines or curvilinear features,
   wherein the linear feature is a group of edge points in a continuous and contiguous arrangement.

3. The method according to claim 1, wherein the method further comprises a step of specifying the location of static linear features manually or computing the location of static linear features automatically.

4. The method according to claim 1, wherein the method further comprises a step of specifying said scene description manually as a plurality of said static linear features with said static linear features' manually predefined said state of occlusion, or computing said scene description automatically from an image of said scene as a plurality of said static linear features with said static linear features' computed said state of occlusion.

5. The method according to claim 1, wherein the method further comprises a step of defining said event manually as a sequence of predefined scene descriptions, or
   learning said event automatically from computed said scene description of an exemplary image sequence of said event.

6. An apparatus for detecting scene events, comprising:
   (a) means for capturing a sequence of background images using a camera;

(b) means for specifying a location of one or a plurality of background linear features, each background linear feature having edge points which are present for most of the images of the background image sequence;
(c) means for computing a state of occlusion of the background linear feature using a computer by;
  (i) inputting an image from a second image sequence:
  (ii) applying an edge detection method to the input image at the same location as the background linear feature to detect an input image linear feature; and
  (iii) comparing the input image linear feature with the background linear feature;
such that the state of occlusion of the background linear feature is occluded if a portion of the background linear feature is not present in the input image from the second image sequence, and
the state of occlusion of the background linear feature is not occluded if the background linear feature is present in the input image from the second image sequence;
(d) means for creating a definition of a scene description as a plurality of background linear features in an image of said scene together with their state of occlusion;
(e) means for creating a definition of an event as a sequence of scene descriptions; and
(f) means for processing said image sequence to detect the occurrence of one or a plurality of said event.

7. The apparatus according to claim 6, wherein the apparatus further comprises means for specifying the location of at least a linear feature that comprises straight lines or curvilinear features,
  wherein the linear feature is a group of edge points in a continuous and contiguous arrangement.

8. The apparatus according to claim 6, wherein the apparatus further comprises means for specifying the location of static linear features manually or means for computing the location of static linear features automatically.

9. The apparatus according to claim 6, wherein the apparatus further comprises means for specifying said scene description manually as a plurality of said static linear features with said static linear features' manually predefined said state of occlusion, or
  means for computing said scene description automatically from an image of said scene as a plurality of said static linear features with said static linear features' computed said state of occlusion.

10. The apparatus according to claim 6, wherein the apparatus further comprises means for defining said event manually as a sequence of predefined scene descriptions, or
  means for learning said event automatically from computed said scene description of an exemplary image sequence of said event.

* * * * *